United States Patent
Harada et al.

(10) Patent No.: US 11,832,278 B2
(45) Date of Patent: Nov. 28, 2023

(54) TERMINAL, RADIO COMMUNICATION METHOD, BASE STATION, AND SYSTEM

(71) Applicant: NTT DOCOMO, INC., Tokyo (JP)

(72) Inventors: Hiroki Harada, Tokyo (JP); Kazuki Takeda, Tokyo (JP); Daisuke Murayama, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 98 days.

(21) Appl. No.: 17/455,834

(22) Filed: Nov. 19, 2021

(65) Prior Publication Data
US 2022/0078749 A1    Mar. 10, 2022

Related U.S. Application Data

(63) Continuation of application No. 16/483,279, filed as application No. PCT/JP2018/003550 on Feb. 2, 2018, now Pat. No. 11,304,179.

(30) Foreign Application Priority Data

Feb. 3, 2017  (JP) .................................. 2017-019066

(51) Int. Cl.
*H04W 72/00* (2023.01)
*H04W 72/30* (2023.01)
(Continued)

(52) U.S. Cl.
CPC .......... *H04W 72/30* (2023.01); *H04L 5/0094* (2013.01); *H04W 56/001* (2013.01); *H04W 72/0453* (2013.01); *H04B 7/0413* (2013.01)

(58) Field of Classification Search
None
See application file for complete search history.

(56) References Cited

U.S. PATENT DOCUMENTS

2013/0039268 A1  2/2013  Blankenship et al.
2015/0055485 A1  2/2015  Kim et al.
(Continued)

FOREIGN PATENT DOCUMENTS

| EP | 3 504 827 A2 | 7/2019 | |
|---|---|---|---|
| WO | 2018/038941 A2 | 3/2018 | |
| WO | WO-2018128427 A1 * | 7/2018 | ............... A01J 5/12 |

OTHER PUBLICATIONS

Office Action issued in Indian Application No. 201937034538 dated Dec. 21, 2021 (7 pages).

(Continued)

*Primary Examiner* — Alex Skripnikov
(74) *Attorney, Agent, or Firm* — Osha Bergman Watanabe & Burton LLP

(57) ABSTRACT

A terminal is disclosed including a receiver that receives a synchronization signal block comprising a broadcast channel comprising given information, provided by higher layer signaling, regarding a control resource set for a control channel; and a processor that determines an offset in a frequency direction with respect to a synchronization signal block including the broadcast channel and the control resource set, wherein the offset is based on the given information. In other aspects, a radio communication method, a base station, and a system are also disclosed.

5 Claims, 11 Drawing Sheets

| | BAND GROUP A (e.g., below 3.5 GHz) | BAND GROUP B (e.g., 3.5-6 GHz) | BAND GROUP C (e.g., above-6 GHz) |
|---|---|---|---|
| SFN/H-SFN | 18 bits | 17 bits | 16 bits |
| SS BLOCK INDEX | 2 bits | 4 bits | 8 bits |
| CONTROL RESOURCE SE | 2 bits | 5 bits | 7 bits |
| SCS | 3 bits | 2 bits | 2 bits |
| CP OVERHEAD | 1 bit | 1 bit | 1 bit |
| THE NUMBER OF ANTENN | 1 bit | 1 bit | 2 bits |
| RESERVED BIT | 5 bits | 10 bits | 12 bits |
| CRC | 16 bits | 16 bits | 16 bits |
| TOTAL | 48 bits | 56 bits | 64 bits |

(51) Int. Cl.
*H04L 5/00* (2006.01)
*H04W 56/00* (2009.01)
*H04W 72/0453* (2023.01)
*H04B 7/0413* (2017.01)

(56) References Cited

U.S. PATENT DOCUMENTS

| | | | |
|---|---|---|---|
| 2018/0146439 | A1 | 5/2018 | Kim et al. |
| 2018/0167946 | A1 | 6/2018 | Si et al. |
| 2018/0206247 | A1* | 7/2018 | Sun .................. H04W 72/51 |
| 2019/0238270 | A1 | 8/2019 | Pan et al. |
| 2019/0254077 | A1 | 8/2019 | Sahlin et al. |
| 2019/0326934 | A1 | 10/2019 | Kim et al. |

OTHER PUBLICATIONS

Extended European Search Report issued in Counterpart European Patent Application No. 21188470.5, dated Nov. 9, 2021 (7 pages).
Office Action in counterpart European Application No. 18748171.8 dated Jun. 7, 2022 (4 pages).
Samsung, "System information delivery," R1-1700888; 3GPP TSG RAN WG1 NR AH; Spokane, WA, USA; Jan. 16-20, 2017; 10 pages.
NTT Docomo Inc., "Discussion on broadcast signal/channel design for NR," R1-1700611; 3GPP TSG RAN WG1 AH_NR; Spokane, WA, USA; Jan. 16-20, 2017; 6 pages.
3GPP TS 36.300 V8.12.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); 149 pages.
International Search Report issued in PCT/JP2018/003550, dated Apr. 24, 2018, 2 pages.
Written Opinion issued in PCT/JP2018/003550, dated Apr. 24, 2018, 3 pages.
3GPP TSG RAN WG1 Meeting #87; R1-1611261 "NR Primary and Secondary Synchronization Signals Design" Huawei, HiSilicon; Reno, USA; Nov. 14-18, 2016 (10 pages).
3GPP TSG-RAN WG2 NR Adhoc; R2-1700506 "On minimum system information" Nokia, Alcatel-Lucent Shanghai Bell; Spokane, USA; Jan. 17-19, 2017 (4 pages).
Partial Supplementary European Search Report issued in European Application No. 18748171.8, dated Nov. 30, 2020 (12 pages).
Extended European Search Report in counterpart European Application No. 18748171.8 dated Mar. 11, 2021 (13 pages).
Office Action issued in Chinese Application No. 201880009980.8, dated Feb. 11, 2023 (16 pages).
Office Action issued in European Application No. 21188470.5, dated Feb. 16, 2023 (4 Pages).

* cited by examiner

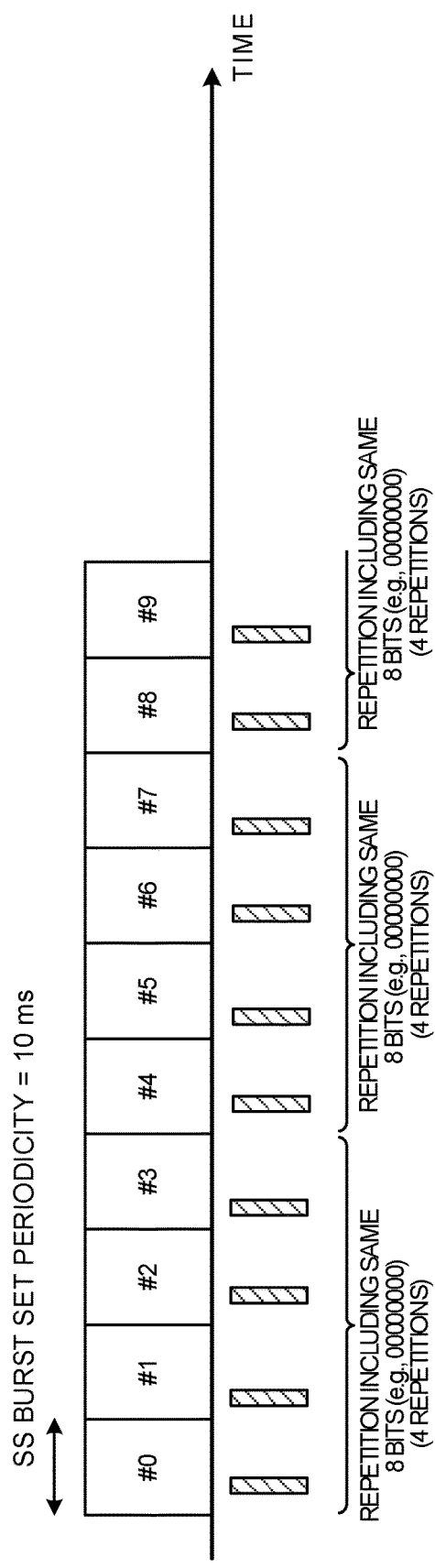
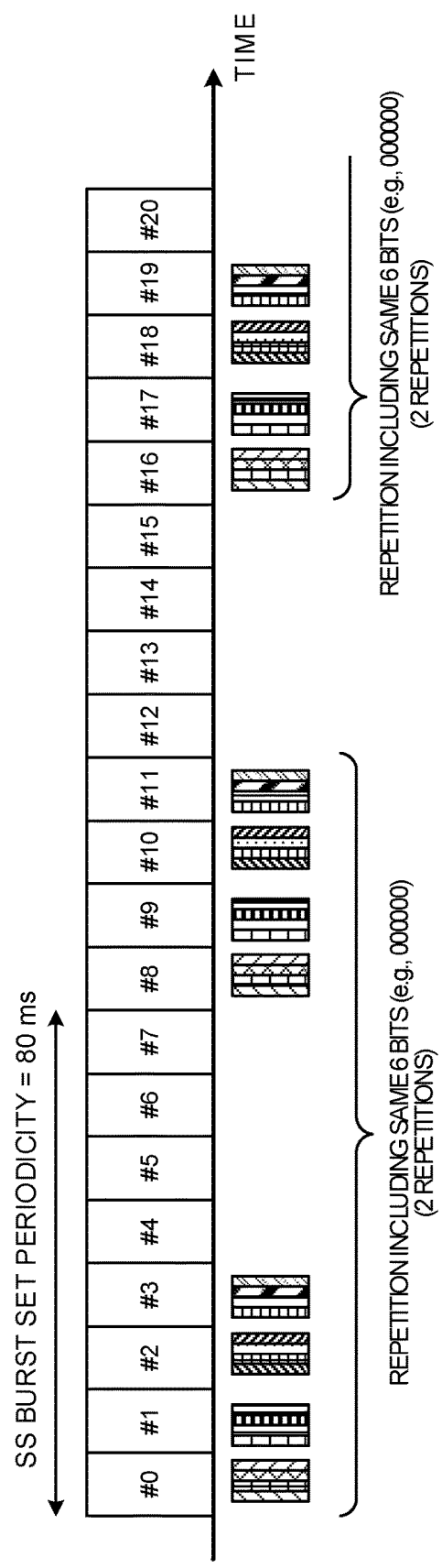

|  | BAND GROUP A (e.g., below 3.5 GHz) | BAND GROUP B (e.g., 3.5-6 GHz) | BAND GROUP C (e.g., above-6 GHz) |
|---|---|---|---|
| SFN/H-SFN | 18 bits | 17 bits | 16 bits |
| SS BLOCK INDEX | 2 bits | 4 bits | 8 bits |
| CONTROL RESOURCE SE | 2 bits | 5 bits | 7 bits |
| SCS | 3 bits | 2 bits | 2 bits |
| CP OVERHEAD | 1 bit | 1 bit | 1 bit |
| THE NUMBER OF ANTENN | 1 bit | 1 bit | 2 bits |
| RESERVED BIT | 5 bits | 10 bits | 12 bits |
| CRC | 16 bits | 16 bits | 16 bits |
| TOTAL | 48 bits | 56 bits | 64 bits |

FIG. 5

TERMINAL, RADIO COMMUNICATION METHOD, BASE STATION, AND SYSTEM

CROSS-REFERENCE TO RELATED APPLICATIONS

The present application is a continuation application and, thereby, claims benefit under 35 U.S.C. § 120 to U.S. patent application Ser. No. 16/483,279 filed on Aug. 2, 2019, titled, "USER TERMINAL AND RADIO COMMUNICATION METHOD," which is a national stage application of PCT Application No. PCT/JP2018/003550, filed on Feb. 2, 2018, which claims priority to Japanese Patent Application No. 2017-019066 filed on Feb. 3, 2017. The contents of the priority applications are incorporated by reference in their entirety.

TECHNICAL FIELD

The present invention relates to a terminal a radio communication method, a base station, and a system in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel.8 or 9), LTE-A (LTE-Advanced, also referred to as LTE Rel.10, 11, 12 or 13) has been specified, and successor systems (e.g. also referred to as FRA (Future Radio Access), 5G (5th Generation mobile communication SYSTEM), NR (New Radio), NX (New radio access), FX (Future Generation Radio access), LTE Rel.14 or 15 onward) to LTE have been studied.

In LTE Rel.10/11, in order to widen the band, introduced is Carrier Aggregation (CA) for aggregating a plurality of component carriers (CC: Component Carrier). Each CC is configured with a system band of LTE Rel.8 as one unit. Further, in CA, a plurality of CCs of the same radio base station (eNB: eNodeB) is set on a user terminal (UE: User Equipment).

On the other hand, in LTE Rel.12, Dual Connectivity (DC) is introduced where a plurality of cell groups (CG: Cell Group) of different radio base stations is set on UE. Each cell group is comprised of at least a single cell (CC). In DC, since a plurality of CCs of different radio base stations is aggregated, DC is also called inter-base station CA (Inter-eNB CA) and the like.

Further, in the existing LTE system (e.g. LTE Rel.8-13), synchronization signals (PSS, SSS) for a user terminal to use in initial access operation, broadcast channel (PBCH) and the like are assigned to beforehand fixedly defined regions. A user terminal detects the synchronization signal by cell search, thereby acquires synchronization with the network, and is capable of identifying the cell (e.g. cell ID) for the user terminal to connect. Further, by receiving the broadcast channel (PBCH, SIB) after the cell search, the terminal is capable of acquiring system information.

PRIOR ART DOCUMENT

Non-Patent Document

[Non-patent Document 1] 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In future radio communication systems (e.g. 5G, NR), it is expected to actualize various radio communication services so as to meet respective different requirements (e.g. ultra-high speed, high capacity, ultra-low delay, and the like). For example, in 5G/NR, it is studied to offer radio communication services called eMBB (enhanced Mobile Broad Band), IoT (Internet of Things), mMTC (massive Machine Type Communication), M2M (Machine to Machine), URLLC (Ultra Reliable and Low Latency Communications) and the like.

Further, in 5G/NR, it is required to support use of flexible numerology and frequencies and actualize dynamic frame configurations. For example, the numerology refers to communication parameters (e.g. subcarrier spacing, bandwidth and the like) applied to transmission/reception of some signal.

However, in the case of supporting different numerology (subcarrier spacing, bandwidth and the like) from the existing LTE system, it has not been determined how to control transmission/reception in communication. For example, in 5G/NR, it is studied to offer services using 100 GHz that is an extremely high carrier frequency, and it is also assumed that a plurality of numerology is supported corresponding to each radio communication service.

In such a case, when control schemes (e.g. signal design and the like) of the existing LTE system are used without any modification, there is the risk that transmission/reception of a signal (e.g. transmission/reception of system information and the like) is not properly performed, and that requirements are not satisfied in each radio communication service.

The present invention was made in view of such a respect, and it is an object of the invention to provide a user terminal and radio communication capable of performing communication properly in a radio communication system for supporting different numerology from the existing LTE system.

Solution to Problem

A user terminal according to one aspect of the present invention is characterized by having a reception section that receives a broadcast channel set for each predetermined frequency band, and a control section that controls reception of the broadcast channel in each frequency band, where in broadcast channels that respectively correspond to different frequency bands, at least one of a size, a resource amount and notification contents is set independently.

Advantageous Effect of the Invention

According to the present invention, it is possible to perform communication properly in a radio communication system for supporting different numerology from the existing LTE system.

BRIEF DESCRIPTION OF DRAWINGS

FIGS. 3A and 3B are diagrams to explain the number of bits used in notification of SFN;

FIG. 5 is a diagram showing one example of designs of NR-PBCH corresponding to a plurality of band groups;

DESCRIPTION OF EMBODIMENTS

Figure 1:
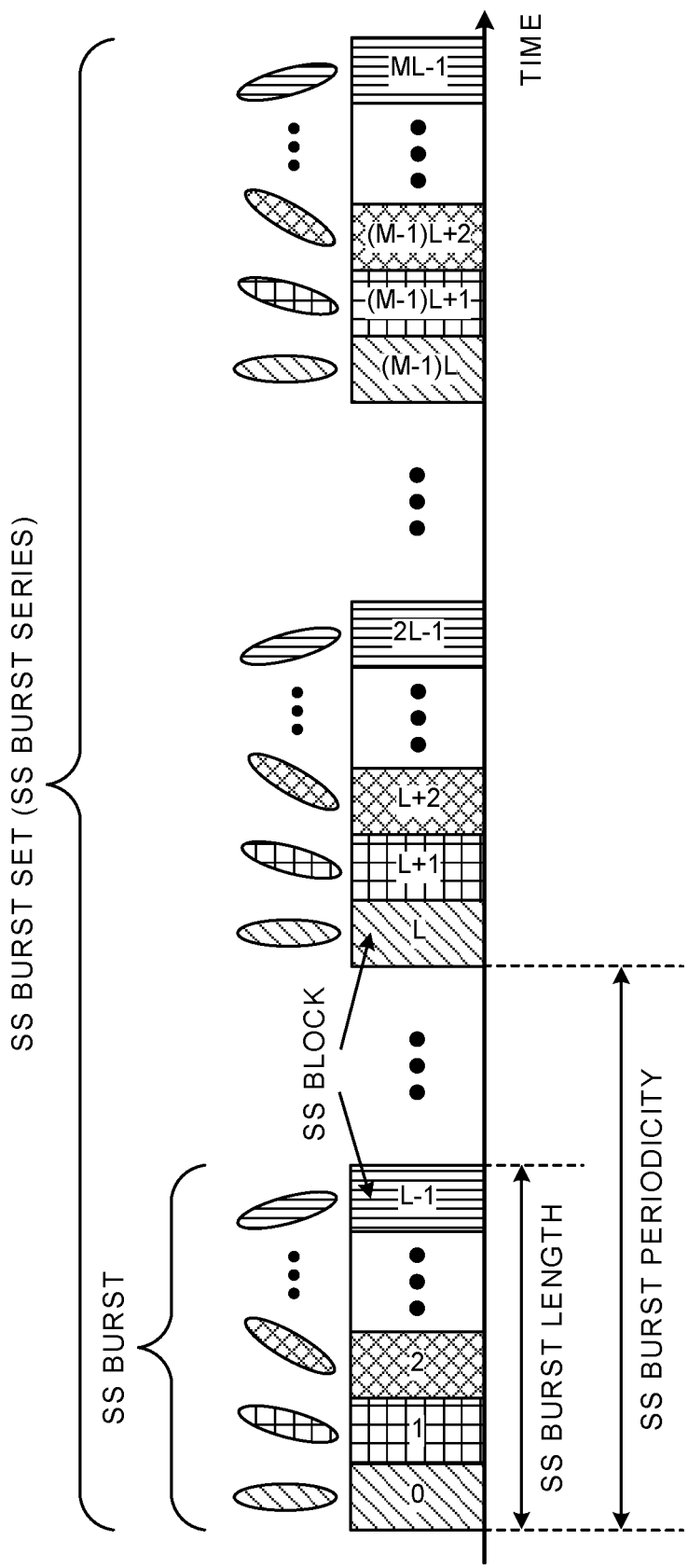
FIG. 1 is a conceptual explanatory diagram of SS blocks.

In initial access processing in the existing LTE system, a user terminal detects a synchronization signal, and is thereby capable of detecting at least time frequency synchronization and cell identifier (cell ID). Further, after acquiring synchronization with the network and obtaining the cell ID, the user terminal receives a broadcast channel (e.g. PBCH) including system information. Subsequent to detection of the synchronization signal and demodulation of the broadcast channel, for example, the user terminal receives SIB (System Information Block), transmits PRACH (Physical Random Access Channel), and the like.

Thus, in the existing LTE system, the user terminal receives the system information (broadcast information) required for downlink communication using MIB (Master Information Block) and the like transmitted on the broadcast channel (PBCH). The broadcast channel (LTE-PBCH) of the existing LTE system is transmitted in Subframe #0 in each radio frame with a periodicity of 10 msec in the center band of 1.4 MHz (center 6RBs).

In the PBCH (MIB) is defined information (downlink bandwidth, downlink control channel configuration, system frame number (SFN), etc.) required to receive downlink with predetermined bits. The user terminal controls reception of SIB (System Information Block) transmitted on a downlink shared data channel (PDSCH) based on LTE-PBCH. By receiving the SIB, the user terminal is capable of obtaining minimum system information required for communication. Therefore, the SIB is also called "remaining minimum system information".

Further, an assignment position of the broadcast channel (LTE-PBCH) in the existing LTE system is fixed in time resources and frequency resources. Thus, since the LTE-PBCH is transmitted from the radio base station in fixed resources, without transmitting particular notification to the user terminal, the terminal is capable of receiving.

Also in future radio communication systems, in order to communicate using a newly introduced carrier (also called the NR carrier (cell)), the user terminal needs to receive system information (MIB and/or SIB) in initial access processing and the like. Further, as a method of transmitting/receiving the SIB (remaining minimum system information), the following Options 1 to 3 are studied.

<Option 1>

Option 1 is a method of transmitting the SIB on the PDSCH as in the existing LTE system. Specifically, after receiving synchronization signals and broadcast channel, a user terminal receives a PDSCH (SIB) scheduled on a downlink control channel (common search space) (Option 1-1). Subsequently, based on the received system information and the like, the user terminal controls a random access procedure.

Alternatively, instead of scheduling the PDSCH (SIB) on the downlink control channel (common search space), the user terminal may designate resources of a PDSCH for transmitting the SIB on the PBCH (Option 1-2).

<Option 2>

Option 2 is a method of transmitting the SIB on a newly defined PBCH. Specifically, after receiving synchronization signals and broadcast channel, a user terminal receives the SIB on the newly defined broadcast channel (second broadcast channel). Subsequently, based on the received system information and the like, the user terminal controls a random access procedure.

<Option 3>

Option 3 is a method of setting initial UL transmission on the PBCH and transmitting a PDSCH (SIB) in a response to the UL transmission.

Thus, in 5G/NR, several methods are studied, as the method of transmitting/receiving system information (e.g. SIB). From the viewpoint of compatibility with the existing LTE system, it is considered applying Option 1-1. In addition, this Embodiment is applicable to any of the Options.

<Ss Block>

Further, in 5G/NR, a signal group including at least the synchronization signals (PSS/SSS) and broadcast channel (PBCH) is defined as an SS block, and it is studied to perform communication using the SS block. For example, in operating a multi-beam and the like, it is expected to periodically transmit the entire SS burst set comprised of a plurality of SS blocks repeatedly.

The SS (synchronization signal) block will be described with reference to FIG. 1. FIG. 1 is a conceptual explanatory diagram of the SS block. The SS Block refers to resources (or resource set) including at least PSS (NR-PSS), SSS (NR-SSS) and PBCH (NR-PBCH).

For example, UE may assume that the PSS, SSS and PBCH received in SS blocks corresponding to the same SS block index are transmitted in the same beam. In addition, in the following description, the PSS, SSS and PBCH may be read respectively with PSS (NR-PSS) for NR, SSS (NR-SSS) for NR and PBCH (NR-PBCH) for NR.

A group of a single or a plurality of SS blocks may be called the SS burst. FIG. 1 shows an example of SS burst length=L. In this example, the SS burst is comprised of L timewise contiguous SS blocks (SS block indexes #0 to #L−1), but is not limited thereto. For example, the SS burst may be comprised of SS blocks with contiguous frequency and/or time resources, or may be comprised of SS blocks with discontiguous frequency and/or time resources.

The SS burst is preferably transmitted every a predetermined periodicity (may be called the SS burst periodicity). Further, a single or a plurality of SS bursts may be called the SS burst set (SS burst series). For example, a radio base station and/or UE may transmit PSS/SSS/PBCH by beam sweeping, using one or more SS bursts included in a single SS burst set. In addition, the UE may assume that the SS burst set is transmitted periodically (with the SS burst set periodicity).

The PSS and SSS or PSS (SSS) and PBCH may be subjected to Time Division Multiplexing (TDM), or may be subjected to Frequency Division Multiplexing (FDM).

Candidate positions of the SS block may be defined for each frequency band in specifications to make a configuration for enabling a user terminal to identify the SS block index from a signal inside the SS block. For example, the base station may include the SS block index in the NR-PBCH to transmit to a user terminal. By this means, the UE is capable of grasping the SS block index from the received PBCH.

In addition, by beforehand defining candidate positions of the SS block, when the user terminal is capable of grasping the SS block index, the terminal is capable of determining a symbol index and/or slot index. Further, by beforehand defining candidate positions of the SS block, it is possible to suppress the number of bits required for notification of the SS block index. In addition, it is possible to transmit PSS/SSS/PBCH corresponding to the same SS block index, using the same beam.

In addition, in future radio communication systems (5G/NR), the case is also considered that a plurality of numerology is set. In such a case, among different numerology, it is considered that contents of the system information (e.g. system frame number and/or subframe index, etc.) differ. However, any configuration (which information is included and the like) of the broadcast channel (NR-PBCH) transmitted in 5G/NR has not been determined. Further, it has not been determined how a user terminal acquires the system information (e.g. SIB) to access the NR cell, after detecting the NR-PBCH.

For example, in the case of using the above-mentioned Option 1-1, a user terminal detecting the synchronization signal (NR-PSS/NR-SSS) and broadcast channel (NR-PBCH) needs to grasp resources (search space) of a downlink control channel for scheduling the system information (minimum SI). In this case, it is considered including information about a region set for the downlink control channel in the NR-PBCH. Further, in order for a user terminal to grasp an SS block index, it is also considered including information about the SS block index in the NR-PBCH.

However, in the case of designing the NR-PBCH so as to support a plurality of communication systems, there is the risk that the size (e.g. payload size) of the NR-PBCH is extremely large. For example, in multi-beam operation (e.g. high-frequency band) using many beams, the number of bits increases to notify of the SS block index. Further, in a wide-band carrier, since a control resource set that is assignment candidates for downlink control information is widely formed, the number of bits increases to notify of the control resource set.

Therefore, the inventors of the present invention noted the respect that at least one of a minimum carrier bandwidth, maximum carrier bandwidth and the maximum number of beams is set differently for each applied frequency band (e.g. predetermined band) in the case of setting a plurality of numerology. Then, the inventors of the invention conceived setting a configuration of NR-PBCH (or NR-PBCH design, NR-PBCH parameter) independently (or differently) for each predetermined frequency band.

In one aspect of the present invention, in broadcast channels set respectively corresponding to different frequency bands, at least one of a size (payload size), resource amount and notification contents is set independently. The resource amount corresponds to resources to which the NR-PBCH is allocated, and is capable of being defined by the number of symbols and/or bandwidth.

Further, using the NR-PBCH, at least one of the following pieces of information (1) to (6) is transmitted to a user terminal. Furthermore, the number of bits of each piece of information may be set to vary for each frequency band. In addition, it is possible to include a part or the whole of each piece of information in the NR-PBCH to notify a user terminal.

(1) Information about a system frame number (SFN and/or H-SFN)
(2) Information about an SS block index
(3) Information about a control resource set (at least frequency resource position information)
(4) Information about subcarrier spacing
(5) Information about cyclic prefix (CP) overhead
(6) Information about the number of antenna ports An Embodiment according to the present invention will be described below in detail with reference to drawings. A radio communication method according to each Embodiment may be applied alone, or may be applied in combination.

(Aspect 1)

Aspect 1 describes the case of defining different NR-PBCH design parameters (NR-PBCH design) for each frequency band. For example, at least one of a payload size, resource amount (the number of symbols and/or bandwidth) and notification contents is set independently (differently) for each frequency band.

At a high-frequency band (e.g. 3.5 GHz or 6 GHz or more), an available bandwidth is wide, while it is necessary to use many beams by application of multi-beam operation and the like. Therefore, the information included in the NR-PBCH relatively increases. Therefore, in the NR-PBCH (e.g. NR-PBCH transmitted at the high-frequency band) that corresponds to the high-frequency band, the payload size and/or resource amount may be set to be large.

At a low-frequency band (e.g. less than 3.5 GHz), there is the case that available bandwidths are limited. In such a case, in the NR-PBCH (e.g. NR-PBCH transmitted at the low-frequency band) that corresponds to the low-frequency band, the resource amount may be limited. Further, at the low-frequency band, since there are few cases where beams high in number are used, the payload size of the NR-PBCH may be set to be small in accordance therewith.

Figure 2A:
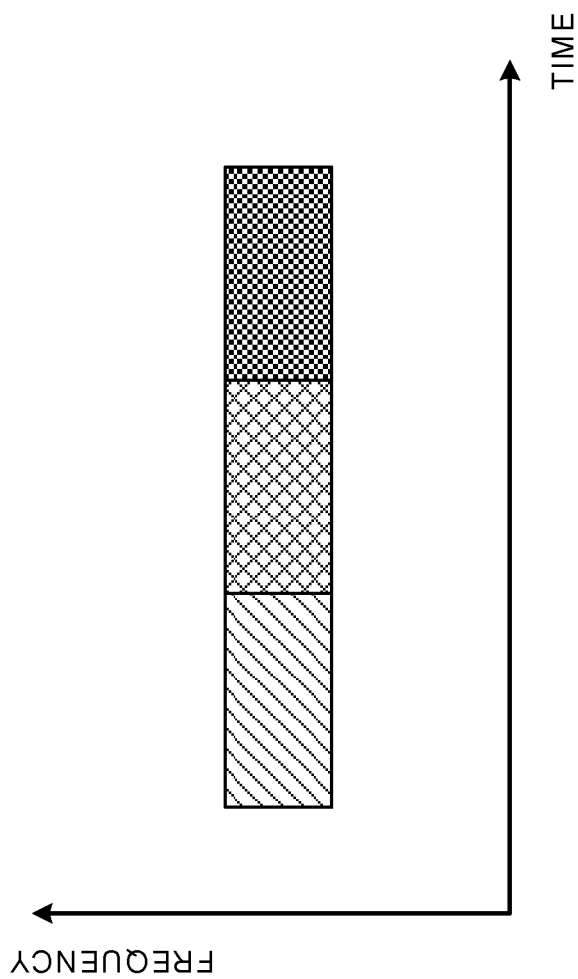
FIGS. 2A and 2B are diagrams showing one example of arrangement of PSS/SSS/PBCH for each frequency band.
Figure 2B:
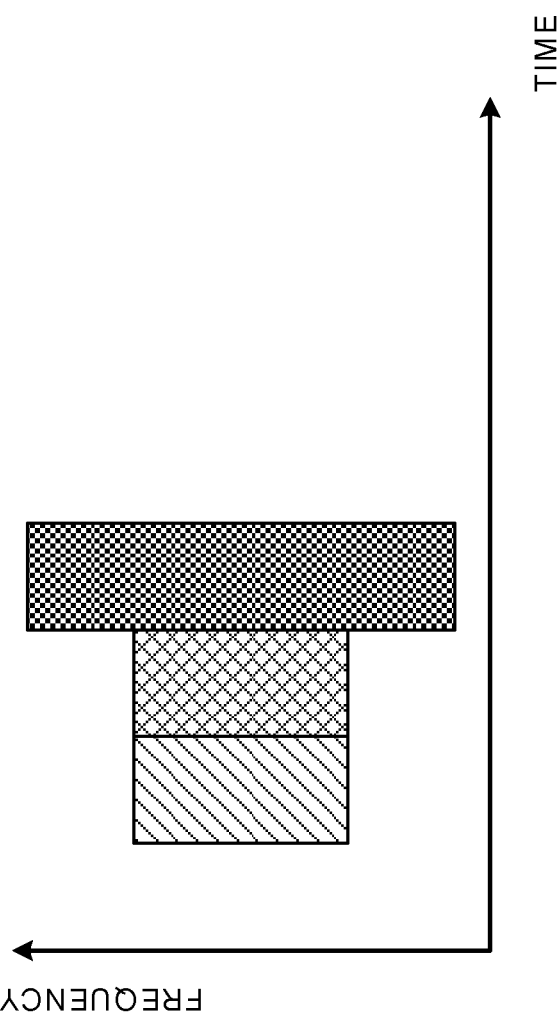

FIG. 2A shows one example of a method of arranging PSS/SSS/PBCH at a frequency band A (e.g. low-frequency band). Herein, the case is shown where the PSS, SSS and PBCH are arranged with the same bandwidth. FIG. 2B shows one example of a method of arranging PSS/SSS/PBCH at a frequency band B (e.g. high-frequency band).

It is assumed that the frequency band B is positioned in a frequency region higher than the frequency band A. In the frequency band B, as compared with the frequency band A, the case is shown where subcarrier spacings (SCS) for the PSS and SSS are set widely to scale the bandwidth linearly. For the PBCH that corresponds to the frequency band B, the case is shown where the subcarrier spacing is set to be wider than PSS/SSS, and the resource amount is extended with the number of RBs increased. By this means, it is possible to also enlarge the payload size of the PBCH.

Thus, in the case where frequency bands are different, since required conditions are also different, by independently setting the respective design parameter of the NR- PBCH, it is possible to perform communication properly, using the PBCH suitable for each frequency band.

(Aspect 2)

Aspect 2 describes the case of including at least a part of information about the system frame number (SFN and/or H-SFN (Hyper-SFN)) in the NR-PBCH. Further, for NR-PBCHs that correspond to different frequencies, the number of bits used in notification of the information about the system frame number may be independently set respectively.

In the case of including the information about the system frame number (hereinafter, described as SFN) in the NR-PBCH transmitted respectively in each frequency band to transmit, a configuration may be made where the value of the SFN is repeated 2n times. By this means, by resetting scrambling applied to NR-PBCH transmission data at the beginning of repetition, it is possible to express (notify of) a part of SFN information implicitly.

In the case of performing communication using the SS block (see FIG. 1), the SS burst set periodicity may be set independently for each frequency band. For example, at the frequency band A (e.g. low-frequency band), the SS burst set periodicity is set at 10 ms (4 repetitions) (see FIG. 3A). On the other hand, at the frequency band B (e.g. high-frequency band), the SS burst set periodicity is set at 80 ms (2 repetitions) (see FIG. 3B). As a matter of course, the SS burst set periodicity and the number of repetitions is not limited thereto. In addition, FIG. 3A shows the case of performing 1-beam (one SS block) transmission, and FIG. 3B shows the case of performing 16-beam (16 SS blocks) transmission.

In FIG. 3A, since a user terminal grasps a periodicity of 10 ms and timing at which the repetition changes, and is thereby capable of determining the detected SFN, instead of 10 bits, the SFN may be notified using 8 bits (2 bits are determined implicitly). In this case, it is possible to define the SFN included in NR-PBCHs (e.g. #0 to #3) repeated 4 times, using information of 8 bits that are the same number. In other words, in the NR-PBCH (transmitted at the frequency band A) that corresponds to the frequency band A, it is possible to set the number of bits used in SFN notification at "8".

In FIG. 3B, since a user terminal grasps a periodicity of 8 ms and timing at which the repetition changes, and is thereby capable of determining the detected SFN, instead of 10 bits, the SFN may be notified using 6 bits (4 bits are determined implicitly). In this case, it is possible to define the SFN included in NR-PBCHs (e.g. a range of #0 to #11) repeated 2 times, using information of 6 bits that are the same number. In other words, in the NR-PBCH (transmitted at the frequency band B) that corresponds to the frequency band B, it is possible to set the number of bits used in SFN notification at "6".

Thus, it is possible to independently set the bit information for SFN notification included in the NR-PBCH for each frequency band. By this means, by setting in consideration of the bit information required for notification of SFN for each frequency band, it is possible to suppress increase in overhead of the NR-PBCH, and properly perform communication, using the PBCH suitable for each frequency band.

(Aspect 3)

Aspect 3 describes the case of including at least a part of information about the SS block index in the NR-PBCH. Further, for NR-PBCHs that correspond to different frequencies, the number of bits used in notification of the information about the SS block index may be independently set respectively.

In the case of performing communication using beams (BF), there is the case where the number of applied beams varies corresponding to a frequency band. For example, it is assumed that the number of beams is set to be high in a high-frequency band to perform communication, as compared with a low-frequency band. In the case of performing communication using SS blocks (see FIG. 1), the number of SS block indexes also varies corresponding to the number of applied bits. In other words, in the case where the radio base station includes the information about the SS block index in the NR-PBCH to notify the user terminal, the number of SS block indexes to notify changes for each frequency band.

Therefore, it is preferable to control communication by defining the number of SS blocks (SS block indexes) inside the SS burst set independently (or to be a different value) for each frequency band. Further, in this case, the number of bits required to represent the SS block index also varies for each frequency band. Accordingly, the number of bits of the SS block index included in the NR-PBCH is controlled respectively for each frequency band.

Figure 4A:
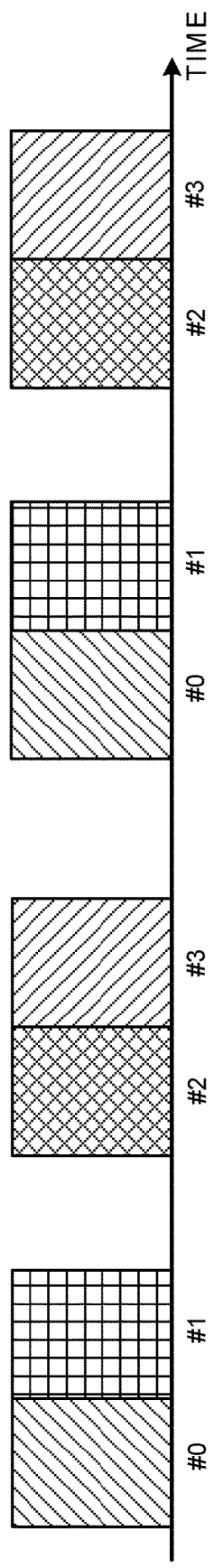
FIGS. 4A and 4B are diagrams showing one example of SS blocks inside an SS burst set.

FIG. 4A shows the case where the maximum number of SS blocks inside the SS burst set is "4" in the frequency band A (e.g. low-frequency band). In this case, in the NR-PBCH that corresponds to the frequency band A, it is possible to set the number of bits used in notification of the SS block index at "2".

Figure 4B:
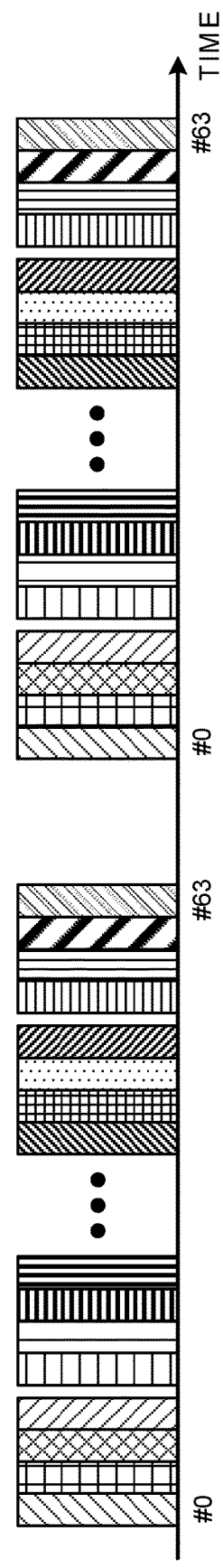

FIG. 4B shows the case where the maximum number of SS blocks inside the SS burst set is "64" in the frequency band B (e.g. low-frequency band). In this case, in the NR-PBCH that corresponds to the frequency band B, it is possible to set the number of bits used in notification of the SS block index at "6".

Alternatively, in the case where the maximum number of SS blocks inside the SS burst set is "256" in a frequency band C, in the NR-PBCH that corresponds to the frequency band C, it is possible to set the number of bits used in notification of the SS block index at "8".

Thus, it is possible to set the bit information for notification of the SS block index included in the NR-PBCH independently, corresponding to the number of SS blocks inside the SS burst set that is set for each frequency band. By this means, it is possible to suppress increase in overhead of the NR-PBCH, and properly perform communication using the PBCH suitable for each frequency band.

(Aspect 4)

Aspect 4 describes the case of including at least a part of information about a control resource set in the NR-PBCH. Further, for NR-PBCHs that correspond to different frequencies, the number of bits used in notification of the information about the control resource set may be independently set respectively.

In future radio communication systems, instead of always allocating downlink control information for some UE to the entire system band to transmit, it is considered that a predetermined frequency region is set to control transmission of the downlink control information. The predetermined frequency region set on UE is also called the control resource set (CORSET), control resource set, control subband, search space set, search space resource set, control region, control subband, NR-PDCCH region or the like.

The control resource set is comprised of a predetermined resource unit, and is capable of being set at a system bandwidth (carrier bandwidth) or less. For example, the control resource set is capable of being comprised of a single or a plurality of RBs (PRB and/or VRB) in the frequency domain. Herein, the RB means a frequency resource block unit comprised of 12 subcarriers. The UE monitors the downlink control information in a range of the control resource set, and is capable of controlling reception. By this means, in reception processing of the downlink control information, the UE is in no need of always monitoring the entire system bandwidth, and is capable of reducing power consumption.

In the case of setting the control resource set, as the information about the control resource set, bandwidth information and/or frequency position information of the control resource set may be included. The frequency position information may be an offset from the SS block frequency position.

The information of a time region of the control resource set may be defined in specifications for each frequency band, or a part of the information may be notified using bits of the NR-PBCH. For example, it is possible to notify of only a part of candidate time positions of the control resource set defined in specifications.

It is assumed that the control resource set is changed and set corresponding to an applicable frequency band (maximum carrier bandwidth). In the case of setting a different maximum carrier bandwidth for each frequency band, candidate frequency positions to allocate the control resource set are higher in number, as the carrier is a wider band, and therefore, the number of bits required to notify of the frequency position may be increased. Accordingly, the number of bits of the control resource set included in the NR-PBCH is essentially controlled respectively for each frequency band.

For example, it is assumed that the frequency band A (e.g. low-frequency band) includes the maximum carrier bandwidth set at 100 MHz, and the SS bandwidth set at 10 MHz, and that the frequency band B (e.g. high-frequency band) includes the maximum carrier bandwidth set at 1 GHz, and the SS bandwidth set at 40 MHz. In addition, the SS bandwidth corresponds to a bandwidth to which the SS block is allocated.

In this case, in the frequency band A, since it is considered that the control resource is set to be narrower than in the frequency band B, it is possible to decrease the number of bits for notifying of bandwidth information of the control resource set. Further, it is possible to also decrease the number of bits for notifying of frequency offset information of the control resource set. On the other hand, in the frequency band B, since it is considered that the control resource is set to be wider than in the frequency band A, it is possible to increase the number of bits for notifying of bandwidth information of the control resource set. Further, it is possible to also increase the number of bits for notifying of frequency offset information of the control resource set.

Thus, corresponding to the control resource set (or, maximum carrier bandwidth) set for each frequency band, it is possible to independently set the bit information for notification of the control resource set included in the NR-PBCH. By this means, it is possible to suppress increase in overhead of the NR-PBCH, and to properly perform communication using the PBCH suitable for each frequency band.

(Aspect 5)

Aspect 5 describes the case of including at least any of information about the subcarrier spacing, information about cyclic prefix (CP) overhead, and information about the number of antenna ports in the NR-PBCH. Further, for NR-PBCHs that correspond to different frequencies, the number of bits may be respectively set independently to use in notification of at least one of the information about the subcarrier spacing, the information about cyclic prefix (CP) overhead, and the information about the number of antenna ports.

In the case where the number of candidates for the subcarrier spacing, the number of candidates for CP overhead, and the number of candidates for the number of antenna ports vary for each frequency band, the case is considered that the number of bits used in notifying the user terminal also varies for each frequency band. Therefore, in consideration of the number of bits required for each frequency band, information about the number of candidates for the subcarrier spacing, the number of candidates for CP overhead, and the number of candidates for the number of antenna ports is included in the NR-PBCH and transmitted to the user terminal.

The user terminal performs reception (reception of the PDSCH scheduled on the PDCCH) of at least the system information, using the subcarrier spacing information, CP overhead information and number-of-antenna port information acquired from the NR-PBCH of a predetermined frequency band.

In addition, in the case where another subcarrier spacing information, CP overhead, and number-of-antenna port information is further indicated by inside the system information, RRC signaling notified after establishing RRC connection and the like, a higher priority may be given to the newly received indication to apply than the indication of the NR-PBCH. By this means, it is possible to apply different subcarrier spacings, CP overheads, numbers of antenna ports and the like between transmission/reception of the system information and data communication.

Alternatively, also in the case of notifying by higher layer signaling and the like after receiving the NR-PBCH, with respect to a part of channel/signal for paging, idle mode measurement and the like, operation may be controlled by applying the information indicated by the NR-PBCH. By this means, it is possible to apply different subcarrier spacings, CP overheads, numbers of antenna ports and the like between the signal for paging, idle mode measurement and the like and the signal under communication.

Further, in the NR-PBCH, reserved bits may be set for future use. In this case, the number of reserved bits may be set independently (e.g. defined as a different value) for each frequency band. Furthermore, also with respect to the number of CRC bits, different values may be set for each frequency band. Thus, by defining a plurality of parameters for each frequency band, it is possible to flexibly set the design of PBCH for each frequency band.

<Configuration of the Frequency Band>

In addition, it is essential only that the "frequency band" in the above-mentioned description is a band that corresponds to beforehand set predetermined frequencies. For example, the band may be a band (band number) set in a future radio communication system, or may be a band group (band group number) including a plurality of bands. For example, set independently is at least one of the size, resource and contents of a PBCH which (is transmitted) corresponds to each band (or each band group).

FIG. 5 shows one example of NR-PBCH designs which (are applied to) respectively correspond to a band group A, band group B and band group C. Herein, the case is shown where the band group A corresponds to frequency bands less than 3.5 GHz, the band group B corresponds to frequency bands of 3.5 GHz or more and less than 6 GHz, and the band group C corresponds to frequency bands of 6 GHz or more. As a matter of course, the number of band groups and classification method are not limited thereto. Further, the number of bits of each parameter is also of one example, and is not limited thereto.

In the band group A, since the number of beams to apply beam forming is low enough, as compared with the band groups B and C, it is possible to decrease the number of bits used in notification of the SS block index. Further, in the band group A, since it is assumed that the maximum carrier bandwidth is set to be narrow, as compared with the band groups B and C, it is possible to decrease the number of bits used in notification of the control resource set. On the other hand, in the band group C, it is possible to define the number of bits used in notification of the SS block index and/or the number of bits used in notification of the control resource set to be higher than in the other band groups.

Further, also with respect to the number of reserved bits set for provision for future use, the number may be a different value among band groups. For example, in the high-frequency band (band group C in FIG. 5), since there is a possibility that the band is extended in the future, the higher number of reserved bits may be secured than in the other frequency bands.

Thus, by setting the PBCH for each frequency band and setting the PBCH design independently, since it is possible to notify the user terminal of the PBCH including necessary information for each frequency band, it is possible to suppress increase in overhead of the PBCH.

Further, different band numbers may be defined for the same frequency band (e.g. frequency band A) to configure that the different band numbers belong to different band groups. In this case, a user terminal that supports both of the band numbers (different band numbers) may perform blind detection of a PBCH in initial access, by expecting a configuration of the PBCH defined in each band group.

(Radio Communication System)

A configuration of a radio communication system according to one Embodiment of the present invention will be described below. In the radio communication system, communication is performed by using any of the above-mentioned Aspects of the invention or combination thereof.

Figure 6:
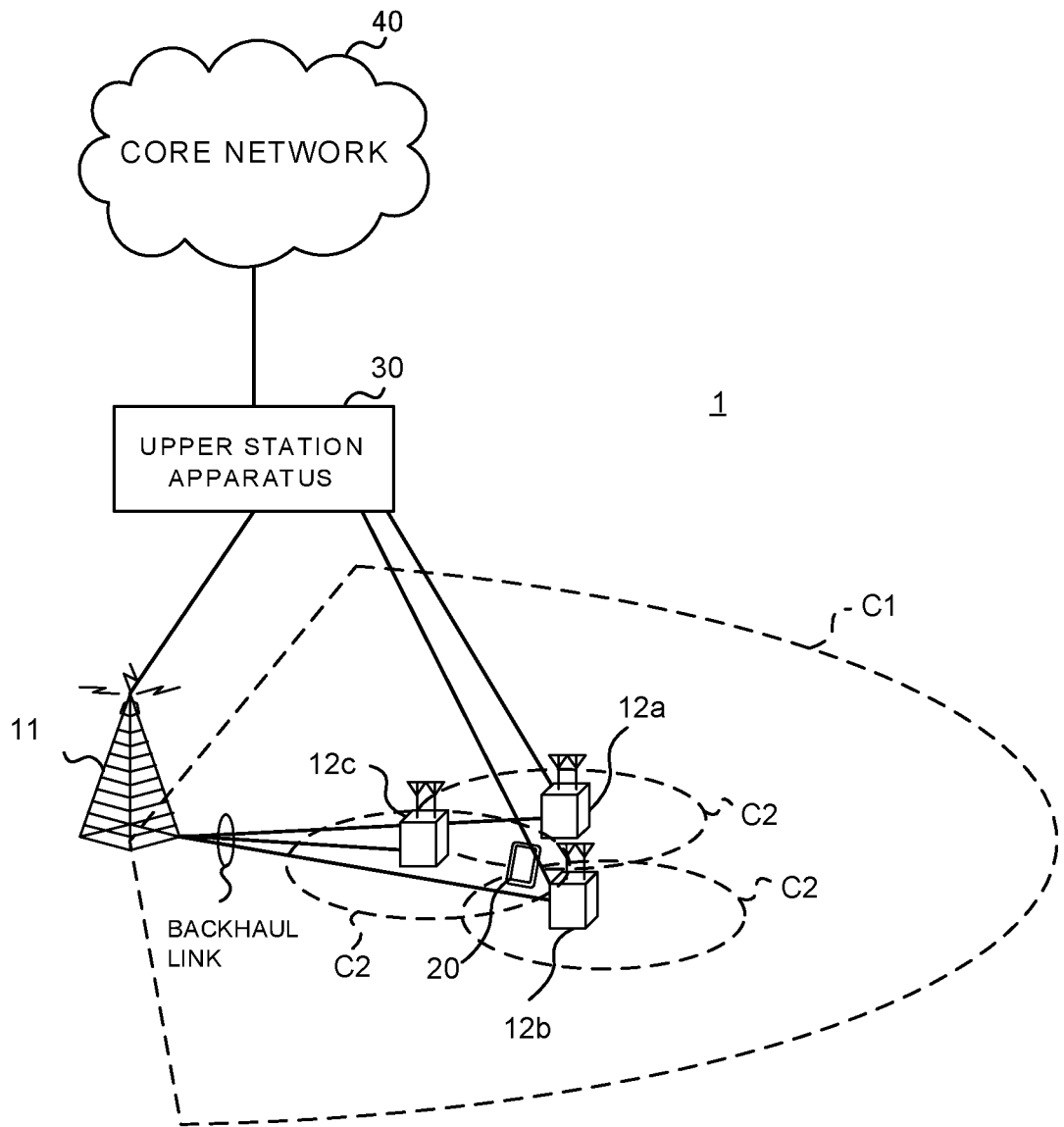
FIG. 6 is a diagram showing one example of a schematic configuration of a radio communication system according to one Embodiment of the present invention.

FIG. 6 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g. 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th Generation mobile communication system), 5G (5th generation mobile communication system), FRA (Future Radio Access), New-RAT (Radio Access Technology) and the like, or may be called the system to actualize each system described above.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g. 5 CCs or less, 6 CCs or more).

The user terminal 20 and radio base station 11 are capable of communicating with each other using carriers (called the existing carrier, Legacy carrier and the like) with a narrow bandwidth in a relatively low frequency band (e.g. 2 GHz). On the other hand, the user terminal 20 and radio base station 12 may use carriers with a wide bandwidth in a relatively high frequency band (e.g. 3.5 GHz, 5 GHz and the like), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g. optical fiber in conformity with CPRI (Common Public Radio Interface), X2 interface and the like), or wireless connection.

The radio base station 11 and each of the radio base stations 12 are respectively connected to an upper station apparatus 30, and are connected to a core network 40 via the upper station apparatus 30. In addition, for example, the upper station apparatus 30 includes an access gateway apparatus, Radio Network Controller (RNC), Mobility Management Entity (MME) and the like, but is not limited thereto. Further, each of the radio base stations 12 may be connected to the upper station apparatus 30 via the radio base station 11.

In addition, the radio base station 11 is a radio base station having relatively wide coverage, and may be called a macro base station, collection node, eNB (eNodeB), transmission/reception point and the like. Further, the radio base station 12 is a radio base station having local coverage, and may be called a small base station, micro-base station, pico-base station, femto-base station, HeNB (Home eNodeB), RRH (Remote Radio Head), transmission/reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier-Frequency Division Multiple Access (SC-FDMA) is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of a single or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH. A common control channel for notifying of the presence or absence of a paging channel is mapped to the downlink L1/L2 control channel (e.g. PDSCH), and data of the paging channel (PCH) is mapped to the PDSCH. Downlink reference signals, uplink reference signals, and separately allocated.

The downlink L1/L2 control channel includes PDCCH (Physical Downlink Control Channel), EPDCCH (Enhanced Physical Downlink Control channel), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. Receipt confirmation information (e.g. also referred to as retransmission control information, HARQ-ACK, ACK/NACK, and the like) of HARQ (Hybrid Automatic Repeat Request) for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data and higher layer control information is transmitted on the PUSCH. Further, radio quality information (CQI: Channel Quality indicator) of downlink, receipt confirmation information and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information Reference Signal (CSI-RS), Demodulation Reference Signal (DMRS), Positioning Reference Signal (PRS) and the like. Further, as uplink reference signals, in the radio communication system 1 are transmitted Sounding Reference Signal (SRS), Demodulation Reference Signal (DMRS) and the like. In addition, the DMRS may be called UE-specific Reference Signal. Further, the transmitted reference signals are not limited thereto.

(Radio Base Station)

Figure 7:
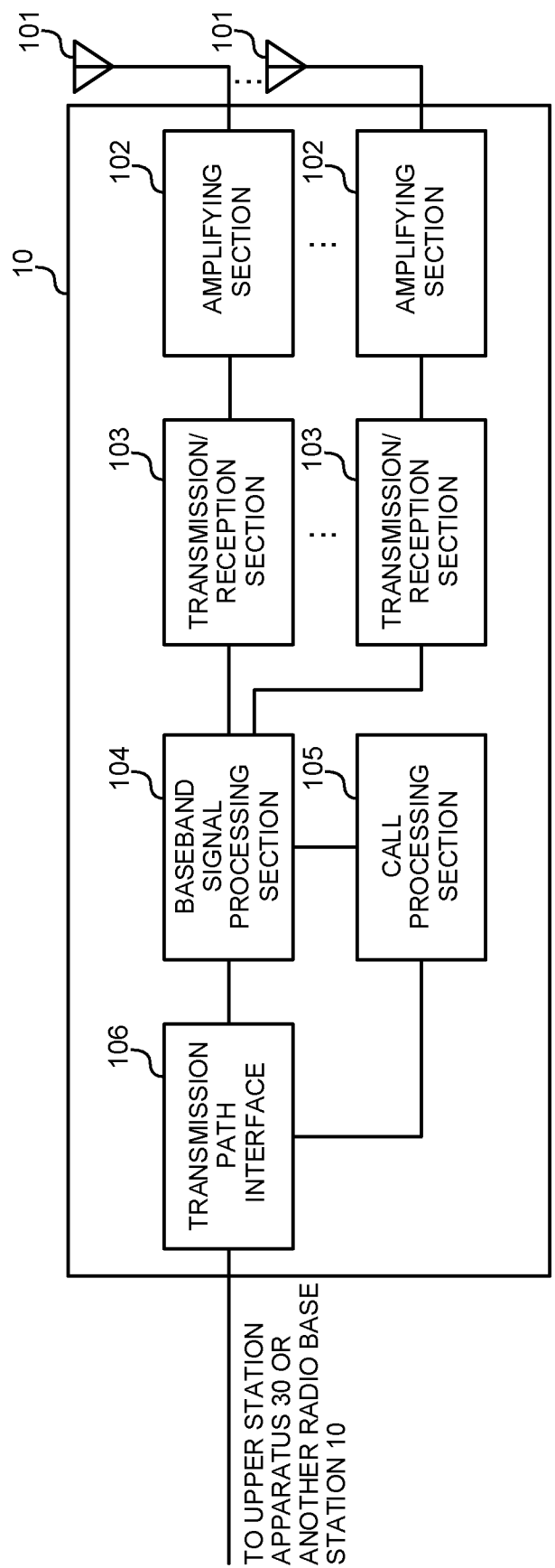
FIG. 7 is a diagram showing one example of an entire configuration of a radio base station according to one Embodiment of the invention.

FIG. 7 is a diagram showing one example of an entire configuration of the radio base station according to one Embodiment of the present invention. The radio base station 10 is provided with a plurality of transmission/reception antennas 101, amplifying sections 102, transmission/reception sections 103, baseband signal processing section 104, call processing section 105, and transmission path interface 106. In addition, with respect to each of the transmission/reception antenna 101, amplifying section 102, and transmission/reception section 103, the radio base station may be configured to include at least one or more.

User data to transmit to the user terminal 20 from the radio base station 10 on downlink is input to the baseband signal processing section 104 from the upper station apparatus 30 via the transmission path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g. transmission processing of HARQ), scheduling, transmission format selection, channel coding, Inverse Fast Fourier Transform (IFFT) processing, and precoding processing to transfer to the transmission/reception sections 103. Further, also concerning a downlink control signal, the section 104 performs transmission processing such as channel coding and Inverse Fast Fourier Transform on the signal to transfer to the transmission/reception sections 103.

Each of the transmission/reception sections 103 converts the baseband signal, which is subjected to precoding for each antenna and is output from the baseband signal processing section 104, into a signal with a radio frequency band to transmit. The radio-frequency signal subjected to frequency conversion in the transmission/reception section 103 is amplified in the amplifying section 102, and is transmitted from the transmission/reception antenna 101. The transmission/reception section 103 is capable of being comprised of a transmitter/receiver, transmission/reception circuit or transmission/reception apparatus explained based on common recognition in the technical field according to the present invention. In addition, the transmission/reception section 103 may be comprised as an integrated transmission/reception section, or may be comprised of a transmission section and reception section.

On the other hand, for uplink signals, radio-frequency signals received in the transmission/reception antennas 101 are amplified in the amplifying sections 102. The transmission/reception section 103 receives the uplink signal amplified in the amplifying section 102. The transmission/reception section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT: INveRSe Discrete Fourier Transform) processing, error correcting decoding, reception processing of MAC retransmission control, and reception processing of RLC layer and PDCP layer to transfer to the upper station apparatus 30 via the transmission path interface 106. The call processing section 105 performs call processing such as setting and release of a communication channel, state management of the radio base station 10, and management of radio resources.

The transmission path interface 106 transmits and receives signals to/from the upper station apparatus 30 via a predetermined interface. Further, the transmission path interface 106 may transmit and receive signals (backhaul signaling) to/from another radio base station 10 via an inter-base station interface (e.g. optical fiber in conformity with CPRI (Common Public Radio Interface), X2 interface).

In addition, the transmission/reception section 103 is provided with an analog beam forming section which is configured to be able to apply multi-beam approach and single-beam approach and provides analog beam forming. In the case of transmitting the synchronization signal and/or paging channel by multi-beam approach, beam sweeping for sweeping the beam is applied with a single or a plurality of contiguous symbols as one unit. The beam forming section is capable of being comprised of a beam forming circuit (e.g. phase shifter, phase shift circuit) or beam forming apparatus (e.g. phase shift device) explained based on the common recognition in the technical field according to the present invention. Further, for example, the transmission/reception antenna 101 is capable of being comprised of an array antenna.

The transmission/reception section 103 transmits the synchronization signal (NR-PSS/SSS), broadcast channel (NR- PBCH), system information (SIB) and the like. The broadcast channels that respectively correspond to different frequency bands are independently set for at least one of the size, resource amount and notification contents.

For example, in the broadcast channels that respectively correspond to (respectively set and/or transmitted in) different frequency bands, the number of bits used in notification of information about the system frame number may be set independently. Further, the broadcast channels that respectively correspond to different frequency bands may be independently set for the number of bits used in notification of information about the synchronization signal block index.

Further, the broadcast channels that respectively correspond to different frequency bands may be independently set for the number of bits used in notification of information about the control resource set that is transmission candidates for the downlink control channel. Furthermore, the broadcast channels that respectively correspond to different frequency bands may be independently set for the number of bits used in notification of information about at least one of the subcarrier spacing, overhead of the cyclic prefix (CP), and the number of antenna ports.

Figure 8:
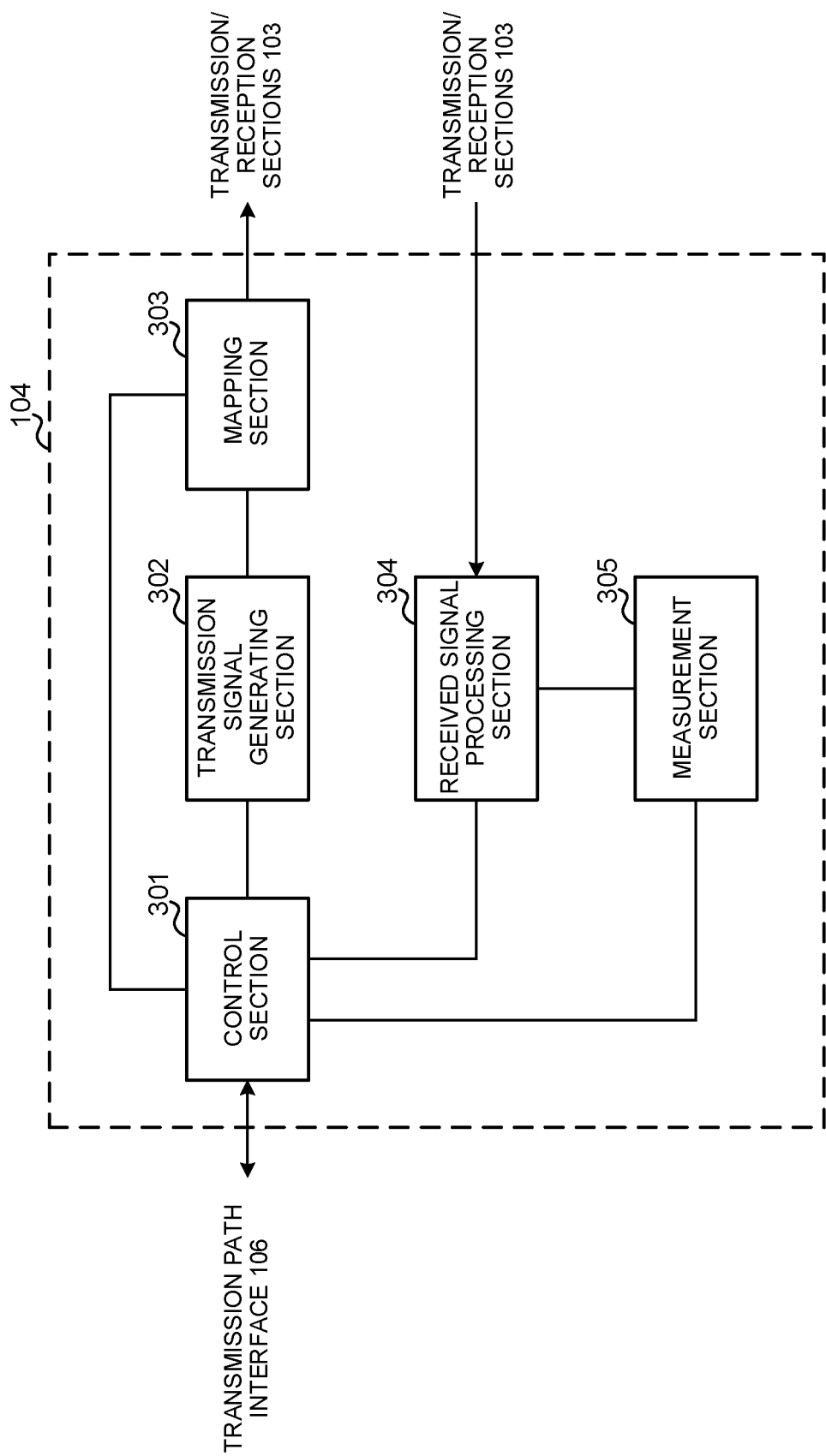
FIG. 8 is a diagram showing one example of a function configuration of the radio base station according to one Embodiment of the invention.

FIG. 8 is a diagram showing one example of a function configuration of the radio base station according to one Embodiment of the present invention. In addition, this example mainly illustrates function blocks of a characteristic portion in this Embodiment, and the radio base station 10 is assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104. The baseband signal processing section 104 is provided with a digital beam forming function for providing digital beam forming.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals (including the synchronization signal, and signals that correspond to the MIB, paging channel and broadcast channel) by the transmission signal generating section 302, and allocation of signals by the mapping section 303.

The control section 310 controls scheduling (e.g. resource allocation, shared control channel to notify of the presence or absence of paging message, signal to notify of multi-beam approach or single-beam approach) of the system information (SIB, MIB, etc.), downlink data signals (including PCH of paging message) transmitted on the PDSCH and downlink control signals transmitted on the PDCCH and/or EPDCCH.

Based on instructions from the control section 301, the transmission signal generating section 302 generates downlink signals (downlink control signal, downlink data signal, downlink reference signal and the like) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates DL assignment to notify of assignment information of downlink signals and UL grant to notify of assignment information of uplink signals.

Further, the downlink data signal is subjected to coding processing and modulation processing, according to a coding rate, modulation scheme and the like determined based on the channel state information (CSI) from each user terminal 20. Further, based on instructions from the control section 301, the transmission signal generating section 302 generates a signal to notify of multi-beam approach or single-beam approach in the common control channel including the MIB or system information that corresponds to the MIB.

Based on instructions from the control section 301, the mapping section 303 maps the downlink signal generated in the transmission signal generating section 302 to predetermined radio resources to output to the transmission/reception section 103. The mapping section 303 is capable of being comprised of a mapper, mapping circuit or mapping apparatus explained based on the common recognition in the technical field according to the present invention.

The received signal processing section 304 performs reception processing (e.g. demapping, demodulation, decoding and the like) on the received signal input from the transmission/reception section 103. Herein, for example, the received signal is the uplink signal (uplink control signal, uplink data signal, uplink reference signal and the like) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs the HARQ-ACK to the control section 301. Further, the received signal processing section 304 outputs the received signal and signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, the measurement section 305 may measure received power (e.g. RSRP (Reference Signal Received Power)), received quality (e.g. RSRQ (Reference Signal Received Quality)), SINR (Signal to Interference plus Noise Ratio)), channel state and the like of the received signal. The measurement result may be output to the control section 301.

(User Terminal)

Figure 9:
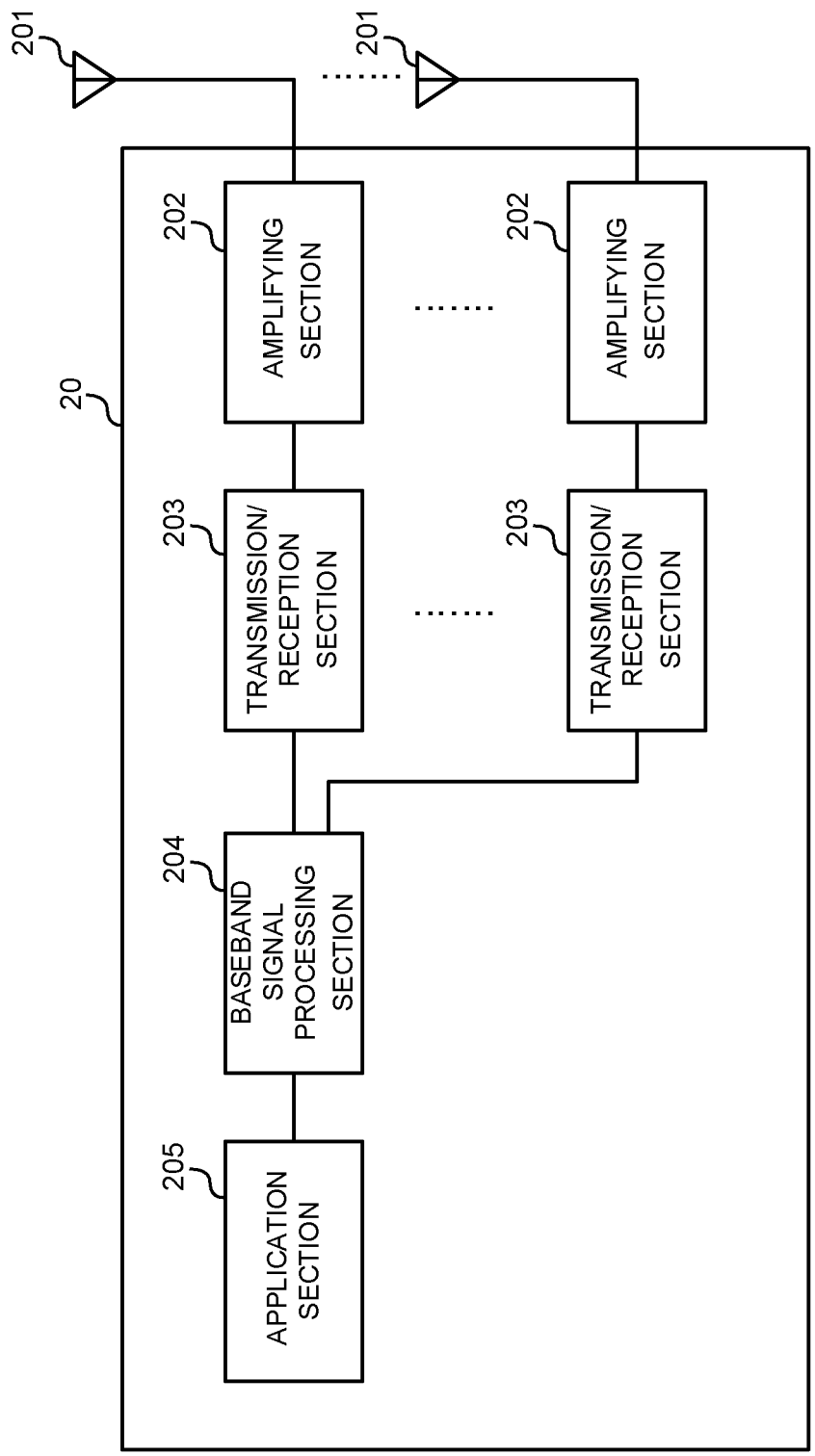
FIG. 9 is a diagram showing one example of an entire configuration of a user terminal according to one Embodiment of the invention.

FIG. 9 is a diagram showing one example of an entire configuration of the user terminal according to one Embodiment of the present invention. The user terminal 20 is provided with a plurality of transmission/reception antennas 201, amplifying sections 202, transmission/reception sections 203, baseband signal processing section 204, and application section 205. In addition, with respect to each of the transmission/reception antenna 201, amplifying section 202, and transmission/reception section 203, the user terminal may be configured to include at least one or more.

Radio-frequency signals received in the transmission/reception antennas 201 are respectively amplified in the amplifying sections 202. Each of the transmission/reception sections 203 receives the downlink signal amplified in the amplifying section 202. The transmission/reception section 203 performs frequency conversion on the received signal into a baseband signal to output to the baseband signal processing section 204. The transmission/reception section 203 is capable of being comprised of a transmitter/receiver, transmission/reception circuit or transmission/reception apparatus explained based on the common recognition in the technical field according to the present invention. In addition, the transmission/reception section 203 may be comprised as an integrated transmission/reception section, or may be comprised of a transmission section and reception section.

The baseband signal processing section 204 performs FFT processing, error correcting decoding, reception processing of retransmission control and the like on the input baseband signal. User data on downlink is transferred to the application section 205. The application section 205 performs processing concerning layers higher than the physical layer and MAC layer, and the like. Further, among the downlink data, broadcast information is also transferred to the application section 205.

On the other hand, for user data on uplink, the data is input to the baseband signal processing section 204 from the application section 205. The baseband signal processing section 204 performs transmission processing of retransmission control (e.g. transmission processing of HARQ), channel coding, precoding, Discrete Fourier Transform (DFT) processing, IFFT processing and the like to transfer to each of the transmission/reception sections 203. Each of the transmission/reception sections 203 converts the baseband signal output from the baseband signal processing section 204 into a signal with a radio frequency band to transmit. The radio-frequency signals subjected to frequency conversion in the transmission/reception sections 203 are amplified in the amplifying sections 202, and transmitted from the transmission/reception antennas 201, respectively.

In addition, the transmission/reception section 203 may further have an analog beam forming section for performing analog beam forming. The analog beam forming section is capable of being comprised of an analog beam forming circuit (e.g. phase shifter, phase shift circuit) or analog beam forming apparatus (e.g. phase shift device) explained based on the common recognition in the technical field according to the present invention. Further, for example, the transmission/reception antenna 201 is capable of being comprised of an array antenna.

The transmission/reception section 203 receives the synchronization signal (NR-PSS/SSS), broadcast channel (NR-PBCH), system information (SIB) and the like. The broadcast channels that respectively correspond to different frequency bands are independently set for at least one of the size, resource amount and notification contents.

Figure 10:
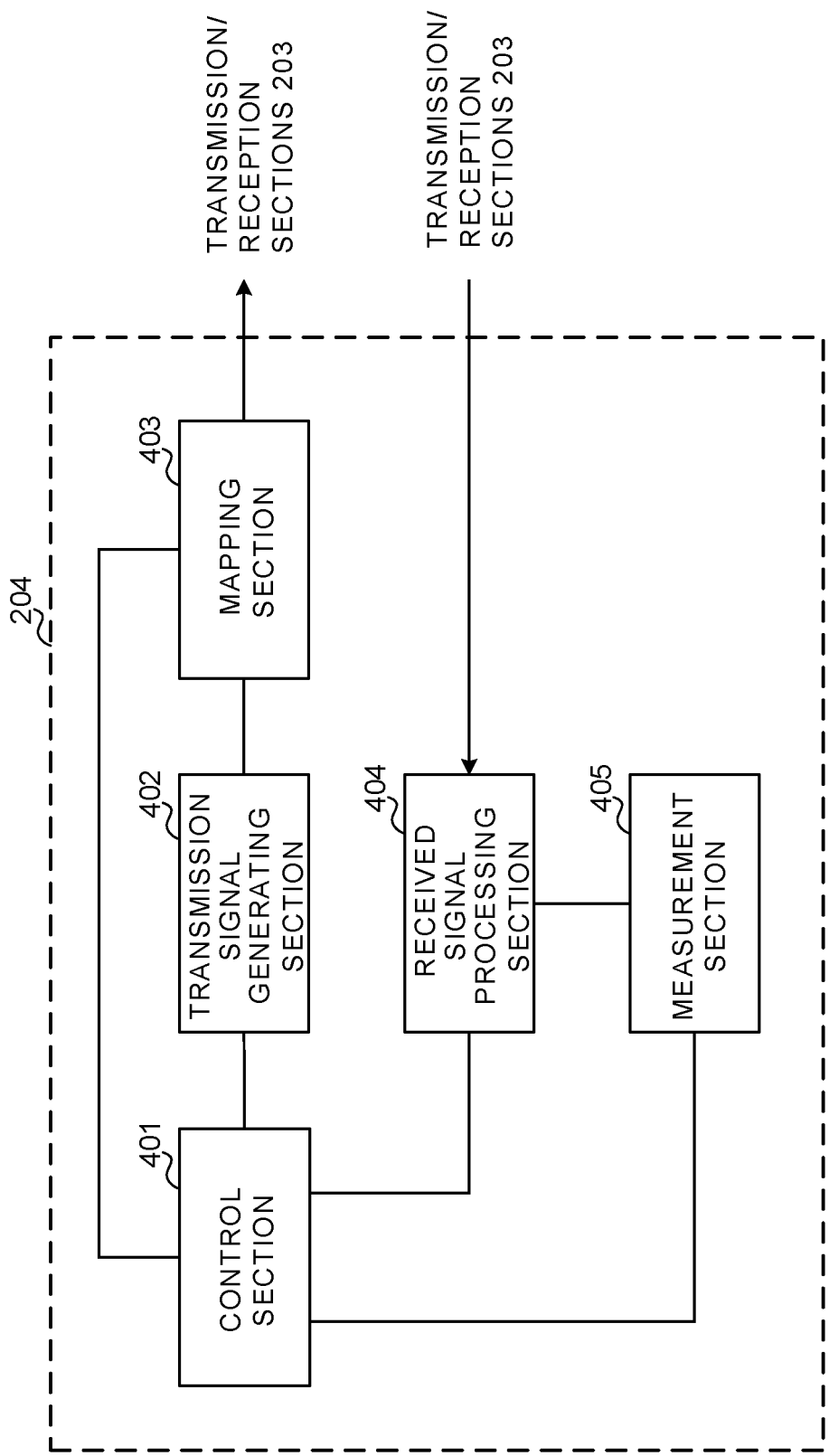
FIG. 10 is a diagram showing one example of a function configuration of the user terminal according to one Embodiment of the invention.

FIG. 10 is a diagram showing one example of a function configuration of the user terminal according to one Embodiment of the present invention. In addition, this example mainly illustrates function blocks of a characteristic portion in this Embodiment, and the user terminal 20 is assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, and allocation of signals by the mapping section 403. Further, the control section 401 controls reception processing of signals by the received signal processing section 404 and measurement of signals by the measurement section 405.

The control section 401 controls reception of the broadcast channel in each frequency band. The broadcast channels that respectively correspond to different frequency bands are independently set for at least one of the size, resource amount and notification contents.

For example, in the broadcast channels that respectively correspond to (respectively set and/or received in) different frequency bands, the number of bits used in notification of information about the system frame number may be set independently. Further, the broadcast channels that respectively correspond to different frequency bands may be independently set for the number of bits used in notification of information about the synchronization signal block index.

Further, the broadcast channels that respectively correspond to different frequency bands may be independently set for the number of bits used in notification of information about the control resource set that is transmission candidates for the downlink control channel. Furthermore, the broadcast channels that respectively correspond to different frequency bands may be independently set for the number of bits used in notification of information about at least one of the subcarrier spacing, overhead of the cyclic prefix (CP), and the number of antenna ports.

In other words, the number of bits used in notification of at least one piece of information described herein may be independently set on (notified to) the user terminal 20 from the radio base station 10, for each of the broadcast channels that respectively correspond to different frequency bands.

Based on instructions from the control section 401, the transmission signal generating section 402 generates uplink signals (uplink control signal, uplink data signal, uplink reference signal and the like) to output to the mapping section 403. The transmission signal generating section 402 is capable of being comprised of a signal generator, signal generating circuit or signal generating apparatus explained based on the common recognition in the technical field according to the present invention.

Based on instructions from the control section 401, for example, the transmission signal generating section 402 generates the uplink control signal about receipt confirmation information and channel state information (CSI). Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmission/reception section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding and the like) on the received signal input from the transmission/reception section 203. Herein, for example, the received signal is the downlink signal (downlink control signal, downlink data signal, downlink reference signal and the like) transmitted from the radio base station 10. The received signal processing section 404 is capable of being comprised of a signal processor, signal processing circuit or signal processing apparatus explained based on the common recognition in the technical field according to the present invention.

Based on instructions from the control section 401, the received signal processing section 404 receives the synchronization signal and broadcast channel which the radio base station applies beam forming to and transmits. Particularly, the section receives the synchronization signal and broadcast channel allocated to at least one of a plurality of time regions (e.g. symbols) constituting a predetermined transmission time interval (e.g. subframe or slot).

The received signal processing section 404 outputs the information decoded by the reception processing to the control section 401. For example, the received signal generating section 404 outputs the broadcast information, system information, RRC signaling, DCI and the like to the control section 401. Further, the received signal processing section 404 outputs the received signal and signal subjected to the reception processing to the measurement section 405.

The measurement section 405 performs measurement on the received signal. For example, the measurement section 405 performs measurement using RS for beam forming transmitted from the radio base station 10. The measurement section 405 is capable of being comprised of a measurement device, measurement circuit or measurement apparatus explained based on the common recognition in the technical field according to the present invention.

For example, the measurement section 405 may measure received power (e.g. RSRP), received quality (e.g. RSRQ, received SINR), channel state and the like of the received signal. The measurement result may be output to the control section 401.

(Hardware Configuration)

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g. by cable and/or radio), and each function block may be actualized by a plurality of these apparatuses.

Figure 11:
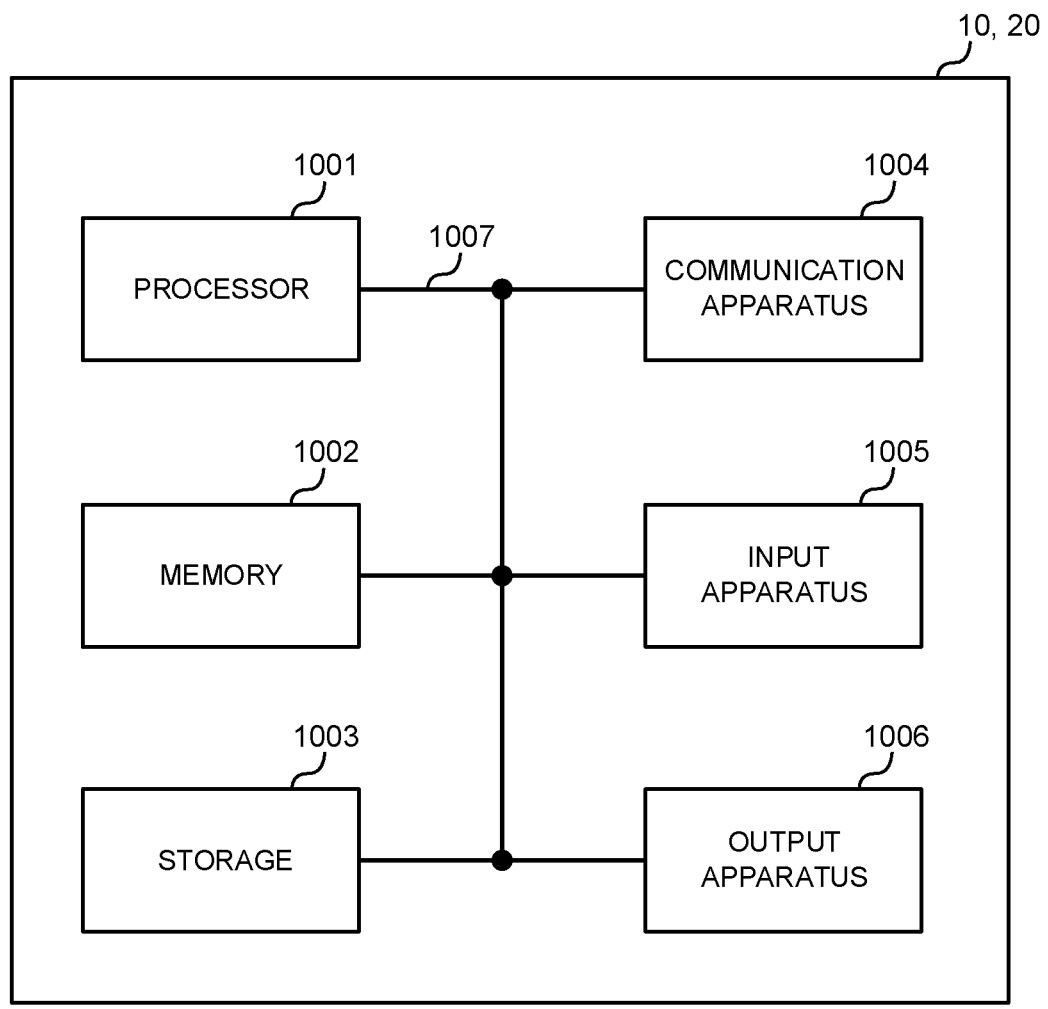
FIG. 11 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 11 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include a single or a plurality, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing apparatus 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g. compact disk (CD-ROM (Compact Disc ROM), etc.), digital multi-purpose disk, Blu-ray (Registered Trademark) disk), removable disk, hard disk drive, smart card, flash memory device (e.g. card, stick, key drive), magnetic stripe, database, server and other proper storage media. The storage 1003 may be called an auxiliary storage apparatus.

The communication apparatus 1004 is hardware (transmission/reception device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-synthesizer and the like.

For example, the transmission/reception antenna 101 (201), amplifying section 102 (202), transmission/reception section 103 (203), transmission path interface 106 and the like as described above may be actualized by the communication apparatus 1004.

The input apparatus 1005 is an input device (e.g. keyboard, mouse, microphone, switch, button, sensor and the like) that receives input from the outside. The output apparatus 1006 is an output device (e.g. display, speaker, LED (Light Emitting Diode) lamp and the like) that performs output to the outside. In addition, the input apparatus 1005 and output apparatus 1006 may be an integrated configuration (e.g. touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (ApplicatioN Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of a single or a plurality of frames in the time domain. The single or each of the plurality of frames constituting the radio frame may be called a subframe. Furthermore, the subframe may be comprised of a single or a plurality of slots in the time domain. Still furthermore, the slot may be comprised of a single or a plurality of symbols (OFDM (Orthogonal Frequency Division Multiplexing) symbol, SC-FDMA (Single Carrier Frequency Division Multiple Access) symbol and the like) in the time domain.

Each of the radio frame, subframe, slot and symbol represents a time unit in transmitting a signal. For the radio frame, subframe, slot and symbol, another name corresponding to each of them may be used. For example, one subframe may be called Transmission Time Interval (TTI), a plurality of contiguous subframes may be called TTI, or one slot may be called TTI. In other words, the subframe and TTI may be the subframe (1 ms) in the existing LTE, may be a frame (e.g. 1 to 13 symbols) shorter than 1 ms, or may be a frame longer than 1 ms.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto. The TTI may be a transmission time unit of a data packet (transport block) subjected to channel coding, or may be a processing unit of scheduling, link adaptation and the like.

The TTI having a time length of 1 ms may be called ordinary TTI (TTI in LTE Rel.8-12), normal TTI, long TTI, ordinary subframe, normal subframe, long subframe or the like. TTI shorter than the ordinary TTI may be called reduced TTI, short TTI, reduced subframe, short subframe or the like.

The resource block (RB) is a resource allocation unit in the time domain and frequency domain, and may include a single or a plurality of contiguous subcarriers in the frequency domain. Further, the RB may include a single or a plurality of symbols in the time domain, and may have a length of 1 slot, 1 subcarrier, or 1 TTI. Each of 1 TTI and 1 subframe may be comprised of a single or a plurality of resource blocks. In addition, the RB may be called a physical resource block (PRB: Physical RB), PRB pair, RB pair and the like.

Further, the resource block may be comprised of a single or a plurality of resource elements (RE: Resource Element). For example, 1 RE may be a radio resource region of 1 subcarrier and 1 symbol.

In addition, structures of the above-mentioned radio frame, subframe, slot and symbol are only illustrative. For example, it is possible to modify, in various manners, configurations of the number of subframes included in the radio frame, the number of slots included in the subframe, the numbers of symbols and RBs included in the slot, the number of subcarriers included in the RB, the number of symbols inside the TTI, the symbol length, the cyclic prefix (CP) length and the like.

Further, the information, parameter and the like explained in the present Description may be expressed by an absolute value, may be expressed by a relative value from a predetermined value, or may be expressed by another corresponding information. For example, the radio resource may be indicated by a predetermined index. Further, equations using these parameters and the like may be different from those explicitly disclosed in the present Description.

The names used in the parameter and the like in the present Description are not restrictive in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g. memory), or may be managed with a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed by another method. For example, notification of the information may be performed using physical layer signaling (e.g. Downlink Control Information (DCI), Uplink Control Information (UCI)), higher layer signaling (e.g. RRC (Radio Resource Control) signaling, broadcast information (Master Information Block (MIB), System Information Block (SIB) and the like), MAC (Medium Access Control) signaling), other signals, or combination thereof.

In addition, physical layer signaling may be called L1/L2 (Layer 1/Layer 2) control information (L1/L2 control signal), L1 control information (L1 control signal) and the like. Further, RRC signaling may be called RRC message, and for example, may be RRC connection setup (Rreconnection setup), RRC connection reconfiguration (Rreconnection reconfiguration) message, and the like. Furthermore, for example, MAC signaling may be notified by MAC Control Element (MAC CE).

Further, notification of predetermined information (e.g. notification of "being X") is not limited to notification that is performed explicitly, and may be performed implicitly (e.g. notification of the predetermined information is not performed, or by notification of different information).

The decision may be made with a value ("0" or "1") expressed by 1 bit, may be made with a Boolean value represented by true or false, or may be made by comparison with a numerical value (e.g. comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating a single or a plurality of (e.g. three) cells (also called the sector). When the base station accommodates a plurality of cells, the entire coverage area of the base station is capable of being divided into a plurality of smaller areas, and each of the smaller areas is also capable of providing communication services by a base station sub-system (e.g. small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by the person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by the upper node in some case. In a network comprised of a single or a plurality of Network Nodes having the base station, it is obvious that various operations performed for communication with the terminal are performed by the base station, one or more Network Nodes (E.g. MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-AdvaNced, 4G (4th generation mobile communication system), 5G (5th generation mobile communication system), FRA (Future Radio Access), New-RAT (Radio Access Technology), NR (New Radio), NX (New radio access), FX (Future Generation Radio access), GSM (Registered Trademark) (Global System for Mobile Communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description are not intended to limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g. search in a table, database or another data structure), ascertaining and the like. Further, "determining" may be regarded as "determining" receiving (e.g. receiving information), transmitting (e.g. transmitting information), input, output, accessing (e.g. accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. In the case of using in the present Description, it is possible to consider that two elements are mutually "connected" or "coupled", by using one or more electric wires, cable and/or print electric connection, and as some non-limited and non-inclusive examples, electromagnetic energy such as electromagnetic energy having wavelengths in a radio frequency region, microwave region and light (both visible and invisible) region.

In the case of using "including", "comprising" and modifications thereof in the present Description and the scope of the claims, as in the term of "provided with", these terms are intended to be inclusive. Further, the term of "or" used in the present Description and the scope of the claims is intended to be not exclusive OR.

As described above, the present invention is specifically described, but it is obvious to a person skilled in the art that the invention is not limited to the Embodiment described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The invention claimed is:

1. A terminal comprising:
    a receiver that receives a broadcast channel comprising information regarding a control resource set; and
    a processor that determines, based on the information, an offset in a frequency direction of the control resource set with respect to a synchronization signal block including the broadcast channel, a time location of the control resource set and a number of resource blocks in the control resource set.

2. The terminal according to claim 1, wherein the receiver receives further information regarding subcarrier spacing by higher layer signaling.

3. A radio communication method comprising:
    receiving a broadcast channel comprising information regarding a control resource set; and
    determining, based on the information, an offset in a frequency direction of the control resource set with respect to a synchronization signal block including the broadcast channel a time location of the control resource set and a number of resource blocks in the control resource set.

4. A base station comprising:
    a transmitter that transmits a broadcast channel comprising information regarding a control resource set; and
    a processor that controls, based on the information, a notification of an offset in a frequency direction of the control resource set with respect to a synchronization signal block including the broadcast channel, a time location of the control resource set and a number of resource blocks in the control resource set.

5. A system comprising a terminal and a base station, wherein:
    the terminal comprises:
        a receiver that receives a broadcast channel comprising information regarding a control resource set; and
        a processor of the terminal that determines, based on the information, an offset in a frequency direction of the control resource set with respect to a synchronization signal block including the broadcast channel, a time location of the control resource set and a number of resource blocks in the control resource set; and
    the base station comprises:
        a transmitter that transmits the broadcast channel; and
        a processor of the base station that controls, based on the information, a notification of the offset in the frequency direction, the time location and the number of resource blocks.

* * * * *